(12) United States Patent
Aida et al.

(10) Patent No.: US 8,089,843 B2
(45) Date of Patent: Jan. 3, 2012

(54) RECORDING DRIVE WAVEFORM ADJUSTING METHOD FOR MANUFACTURING MASTER DISC, MASTER DISC MANUFACTURING METHOD, MASTER DISC MANUFACTURING APPARATUS, AND MASTER DISC

(75) Inventors: Toru Aida, Kanagawa (JP); Akitoshi Suzuki, Shizuoka (JP); Shinobu Hayashi, Shizuoka (JP); Akiya Saito, Kanagawa (JP)

(73) Assignee: Sony Disc & Digital Solutions, Inc., Tokyo (JP)

( * ) Notice: Subject to any disclaimer, the term of this patent is extended or adjusted under 35 U.S.C. 154(b) by 279 days.

(21) Appl. No.: 12/166,974

(22) Filed: Jul. 2, 2008

(65) Prior Publication Data

US 2009/0041933 A1    Feb. 12, 2009

(30) Foreign Application Priority Data

Aug. 10, 2007    (JP) .................... 2007-209674

(51) Int. Cl.
*G11B 7/007* (2006.01)
(52) U.S. Cl. ................ 369/59.12; 369/47.53; 369/275.3
(58) Field of Classification Search .............. 369/47.5, 369/47.53, 53.26, 59.12, 275.3, 275.4; 427/162
See application file for complete search history.

(56) References Cited

U.S. PATENT DOCUMENTS

| | | | |
|---|---|---|---|
| 6,175,541 B1 | 1/2001 | Shoji et al. | |
| 6,178,148 B1 * | 1/2001 | Shoji et al. | 369/47.3 |
| 6,181,654 B1 | 1/2001 | Shoji et al. | |
| 6,580,678 B2 * | 6/2003 | Kondo et al. | 369/275.2 |
| 6,671,243 B2 * | 12/2003 | Ando et al. | 369/59.1 |
| 7,095,696 B2 | 8/2006 | Nakajima et al. | |
| 7,224,660 B2 * | 5/2007 | Nakajo | 369/59.11 |
| 2003/0021206 A1 * | 1/2003 | Tomita | 369/53.23 |
| 2004/0013068 A1 | 1/2004 | Kato et al. | |
| 2005/0226999 A1 * | 10/2005 | Kouchiyama et al. | 427/162 |
| 2006/0098558 A1 * | 5/2006 | Kobayashi et al. | 369/275.1 |
| 2007/0058519 A1 * | 3/2007 | Reiter et al. | 369/275.3 |
| 2008/0002563 A1 * | 1/2008 | Yamamoto et al. | 369/275.4 |

FOREIGN PATENT DOCUMENTS

| | | |
|---|---|---|
| JP | 2002-084653 | 3/2002 |
| JP | 2004-047025 | 2/2004 |
| JP | 2004-199848 | 7/2004 |
| JP | 2005-276437 | 10/2005 |
| JP | 3881673 | 11/2006 |
| JP | 2006-344339 | 12/2006 |
| JP | 2007-048412 | 2/2007 |
| WO | 02-084653 | 10/2002 |
| WO | 04/001730 | 12/2003 |
| WO | 2006/045332 | 5/2006 |
| WO | WO 2006045332 A1 * | 5/2006 |
| WO | 2007/026294 | 3/2007 |

* cited by examiner

*Primary Examiner* — Wayne Young
*Assistant Examiner* — Thomas Alunkal
(74) *Attorney, Agent, or Firm* — K&L Gates LLP

(57) ABSTRACT

A recording drive waveform adjusting method for manufacturing a master disc is provided. The method includes forming an exposed area in an inorganic resist layer for test exposure by irradiating a master disc having the inorganic resist layer with laser light of a recording power based on a recording drive waveform according to a test recording signal. The method also includes obtaining reflected-light information by irradiating the exposed area formed in the test exposure with laser light of a reproducing power, determining whether the recording drive waveform is appropriate by using the reflected-light information, and correcting the recording drive waveform if the recording drive waveform is determined to be inappropriate in the determination.

12 Claims, 12 Drawing Sheets

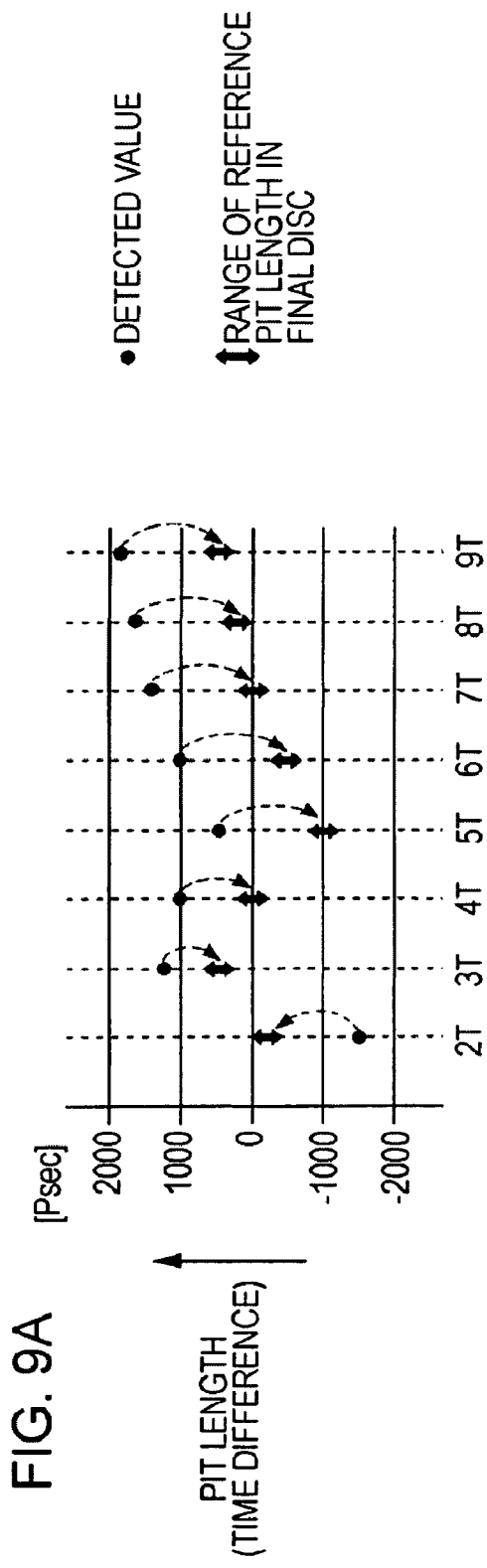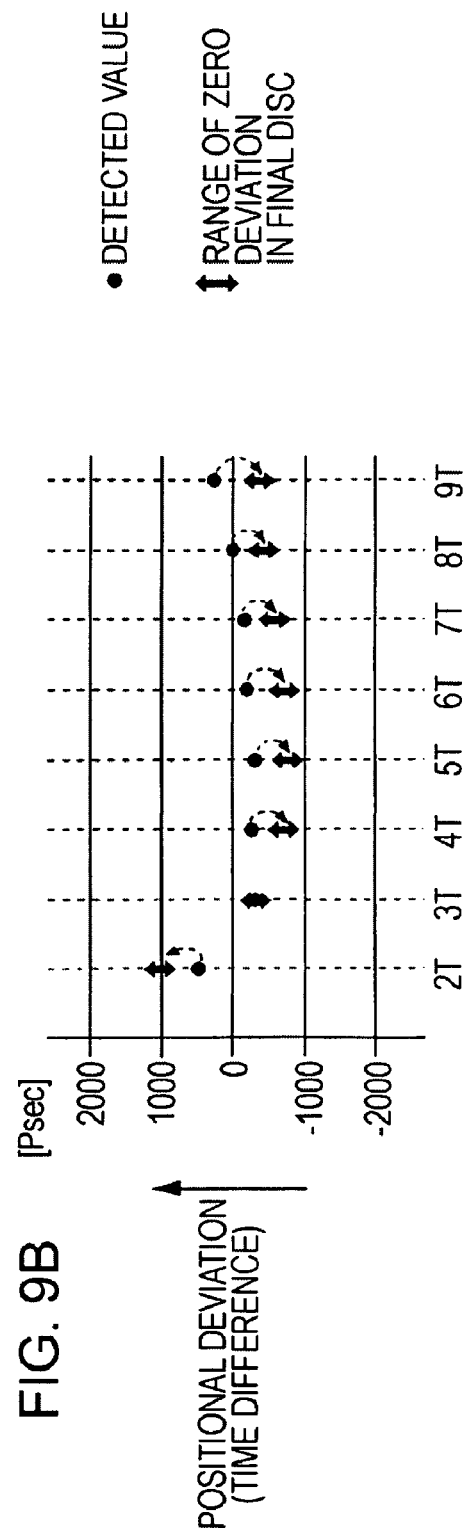

RECORDING DRIVE WAVEFORM ADJUSTING METHOD FOR MANUFACTURING MASTER DISC, MASTER DISC MANUFACTURING METHOD, MASTER DISC MANUFACTURING APPARATUS, AND MASTER DISC

CROSS REFERENCES TO RELATED APPLICATIONS

The present application claims priority to Japanese Patent Application JP 2007-209674 filed in the Japanese Patent Office on Aug. 10, 2007, the entire contents of which are incorporated herein by reference.

BACKGROUND

The present disclosure relates to a master disc used to manufacture optical discs, a recording drive waveform adjusting method to manufacture the master disc, a master disc manufacturing method, and a master disc manufacturing apparatus. Particularly, the present disclosure relates to a technique of obtaining an appropriate recording drive waveform (strategy pattern).

In a process of manufacturing optical discs for reproducing only having a pit array of so-called emboss pits, a master disc having a projection-and-depression pattern corresponding to a pit array is manufactured first. Then, a stamper is formed based on the master disc, and optical discs are mass-manufactured by using the stamper.

For manufacturing the master disc, a master disc manufacturing apparatus, typically called a cutting apparatus or a mastering apparatus, is used.

The master disc manufacturing apparatus allows a master disc substrate on which a resist layer is formed to rotate, and applies laser light collected by an objective lens. At this time, the laser light is focus-controlled so that the laser light follows on the surface of the resist master disc within its focus depth. Also, the laser light is applied onto the resist layer while being controlled to form an exposure pattern corresponding to a pit array according to a recording signal.

After the exposure pattern corresponding to a pit array has been formed in the resist material on the master disc, then development (etching) is performed in a typical case so as to form a pit array of a projection-and-depression pattern by using steps of the resist material.

Japanese Unexamined Patent Application Publication Nos. 2007-48412, 2006-344399, 2005-276437, and 2004-47025, Japanese Patent No. 3881673, Japanese Unexamined Patent Application Publication No. 2004-199848, and International Publication Pamphlet No. 2002/084653 disclose various techniques about correction of write strategy patterns to perform laser drive according to recording data in a recording/reproducing apparatus for a write-once disc or a rewritable disc.

When laser irradiation is performed according to a recording signal in order to manufacture a master disc, an appropriate write strategy is necessary to be set. For example, when a master disc for manufacturing an optical disc having pit lengths of 2T to 9T (T is a channel clock cycle) is manufactured, exposure corresponding to pits of 2T to 9T is performed by laser irradiation. At that time, when a strategy pattern (recording drive waveform applied to a laser light emitting unit) is appropriately adjusted for each pit length of 2T to 9T, the quality of a pit array of optical discs as end products can be maintained.

However, strategy adjustment during manufacturing of a master disc is troublesome and is disadvantageous for increasing efficiency of a process of manufacturing optical discs.

According to related arts, strategy adjustment in a master disc manufacturing apparatus is performed in the following procedure. First, cutting (exposure) of a master disc is performed in a certain strategy pattern setting state, and then development is performed to manufacture a master disc. Furthermore, a stamper is manufactured based on the master disc. Then an optical disc as an end product is manufactured in the same manner as in an ordinary manufacturing process by using the stamper. In this stage, the manufactured optical disc is evaluated. For example, reproducing of the optical disc is performed, jitter and asymmetry of a reproduced signal are measured to evaluate signal quality, and whether a high-quality pit array is formed is checked. Based on the check result, an appropriate condition (correction value) of a strategy pattern in the stage of manufacturing a master disc is calculated and strategy adjustment in the master disc manufacturing apparatus is performed.

In the above-described procedure, the following problems occur.

First, an appropriate strategy condition is calculated after manufacturing an optical disc as an end product, and thus the master disc, stamper, and optical disc that are manufactured in the first stage are used for strategy adjustment. That is, the master disc, stamper, and optical disc are not used as a real product and become unnecessary after strategy adjustment has been done. This causes waste.

Furthermore, even an optical disc is manufactured for strategy adjustment in manufacturing of a master disc, which takes time and is very insufficient. This step of manufacturing an optical disc for strategy adjustment imposes a heavy burden on a process of manufacturing optical discs. Also, it may be impossible to automate the step of manufacturing an optical disc.

Furthermore, if strategy adjustment is not appropriately performed in one step and if the strategy adjustment is repeated several times, the above-described waste (waste of products and process) doubles. In order to avoid such waste, a recording signal as a test pattern that is specialized to easily calculate a strategy condition should be prepared so that appropriate strategy adjustment can be performed in one step. For example, a recording signal including a 2T repetition pattern may be used. For this purpose, operations and an apparatus configuration that are unnecessary in an ordinary master disc manufacturing stage, e.g., setting of a test signal and supply of the test signal for cutting, become necessary.

SUMMARY

The present disclosure is directed to realizing very efficient strategy adjustment for laser drive in a stage of manufacturing a master disc.

A recording drive waveform adjusting method for manufacturing a master disc according to an embodiment includes forming an exposed area in an inorganic resist layer for test exposure by irradiating a master disc having the inorganic resist layer with laser light of a recording power based on a recording drive waveform according to a test recording signal; obtaining reflected-light information by irradiating the exposed area formed in the test exposure with laser light of a reproducing power determining whether the recording drive waveform is appropriate by using the reflected-light information; and correcting the recording drive waveform if the recording drive waveform is determined to be inappropriate in the determination.

A master disc manufacturing method according to an embodiment includes forming an exposed area in an inorganic resist layer for test exposure; obtaining reflected-light information; determining whether the recording drive waveform is appropriate; and correcting the recording drive waveform in the above-described recording drive waveform adjusting method. The master disc manufacturing method also includes forming an exposed area for forming a pit pattern on the inorganic resist layer for real exposure by performing laser irradiation of a recording power according to a real recording signal by using an appropriate recording drive waveform after the recording drive waveform has been determined to be appropriate in the determination; and developing the master disc having the exposed area that is formed based on the real recording signal in the real exposure, so as to form a master disc on which a pit pattern of projections and depressions is formed.

In the test exposure, a test area as an area other than an information pattern formation area where the exposed area based on the real recording signal is formed in the real exposure is selected on the master disc, and the exposed area is formed in the test area.

Also, in the test exposure, the exposed area is formed as a concentric track.

The recording drive waveform is a waveform pattern to perform laser irradiation in a PTM method.

In the determination, it is determined whether the recording drive waveform is appropriate by comparing pit-length information or pit-position information obtained from the reflected-light information with reference pit-length information or reference pit-position information set as a reference for comparison.

In the correction, an edge timing or a level of a pulse in a pulse pattern set as a recording drive waveform is corrected.

A master disc manufacturing apparatus according to an embodiment includes a recording drive waveform outputting unit configured to output a recording drive waveform according to an input recording signal; a master disc recording/reproducing unit capable of forming an exposed area by irradiating a master disc having an inorganic resist layer with laser light of a recording power based on the recording drive waveform output from the recording drive waveform outputting unit and outputting reflected-light information by irradiating the exposed area with laser light of a reproducing power; and a determining/correcting unit configured to perform a computing process of determining whether the recording drive waveform is appropriate by using the reflected-light information and a correcting process of correcting the recording drive waveform in accordance with a determination result.

A master disc according to an embodiment is manufactured by the steps of forming an exposed area in an inorganic resist layer by irradiating a master disc having the inorganic resist layer with laser light of a recording power based on a recording drive waveform according to a test recording signal; obtaining reflected-light information by irradiating the exposed area with laser light of a reproducing power; determining whether the recording drive waveform is appropriate by using the reflected-light information; correcting the recording drive waveform if the recording drive waveform is determined to be inappropriate; forming an exposed area for forming a pit pattern on the inorganic resist layer by performing laser irradiation of a recording power according to a real recording signal by using an appropriate recording drive waveform after the recording drive waveform has been determined to be appropriate in the determination; and developing the master disc having the exposed area that is formed based on the real recording signal, so as to form a pit pattern of projections and depressions.

With the above-described configuration, a master disc having an inorganic resist layer is irradiated with laser light for performing exposure to form a pit pattern. It has been verified that a difference occurs in the amount of light detected as reflected-light information of laser light between an exposed portion (portion to become a pit) of the inorganic resist layer and an unexposed portion (portion to become a land between pits).

In a state where exposure has been performed by using a test recording signal, reflected-light information corresponding to a portion of pits and a portion of lands can be obtained by performing laser light irradiation of a reproducing power on the exposed portion in a stage before development. That is, information of a pit array of pits/lands to be formed by development performed thereafter can be read. This means that the lengths and positions of pits to be formed (positional deviation with reference to a channel clock) can be determined.

In the recording drive waveform (strategy pattern), a pulse pattern is set according to a pit length to be formed. For example, in a master disc to manufacture an optical disc having pits of 2T to 9T, strategy patterns are set for 2T, 3T, 4T, ..., and 9T, respectively. Here, in order to optimize the strategy patterns, a portion on which test exposure has been performed is reproduced to read reflected-light information, the pit length and pit position of each T are checked, and the strategy patterns are corrected to obtain appropriate pit lengths and pit positions.

That is, the strategy patterns can be corrected by performing test exposure and reproducing the exposed area Accordingly, strategy patterns for laser light irradiation in a master disc manufacturing stage can be adjusted by test exposure, reproducing of an exposed area, and determination of pit lengths and pit positions from reflected-light information obtained through reproducing. That is, strategy adjustment can be performed without manufacturing an optical disc as an end product, and the efficiency of the entire process can be significantly increased. Of course, a master disc, a stamper, and an optical disc that are wasted later are not manufactured for strategy adjustment, so that the waste can be eliminated.

Furthermore, the strategy adjustment can be automated and the process from test exposure to strategy correction does not require so much time. Thus, the efficiency the process does not decrease even if the strategy, correction is repeated several times. Accordingly, strategy patterns can be optimized more accurately and can be adjusted more accurately. Also, a special signal is unnecessary as a test recording signal, and an ordinary recording signal can be used as a test recording signal, and thus the labor of an operator can be reduced.

Also, a master disc on which test exposure has been performed can be used as a master disc for actual manufacturing. Chat is, strategy adjustment is performed based on test exposure on the master disc that is actually used. In other words, strategy adjustment is performed without change in condition of the master disc. Therefore, high adjustment accuracy is realized.

Additional features and advantages are described herein, and will be apparent from the following Detailed Description and the figures.

BRIEF DESCRIPTION OF THE FIGURES

FIGS. 9A and 9B are illustrations of comparison and correction of the detected values and the reference ranges according to the embodiment;

DETAILED DESCRIPTION

Hereinafter, an embodiment is described in the following order.

<1. Disc manufacturing process>
<2. Configuration of master disc manufacturing apparatus>
<3. Strategy correcting operation>
<1. Disc Manufacturing Process>

First, a process of manufacturing an optical disc is described with reference to a schematic view in FIG. 11.

Figure 11:
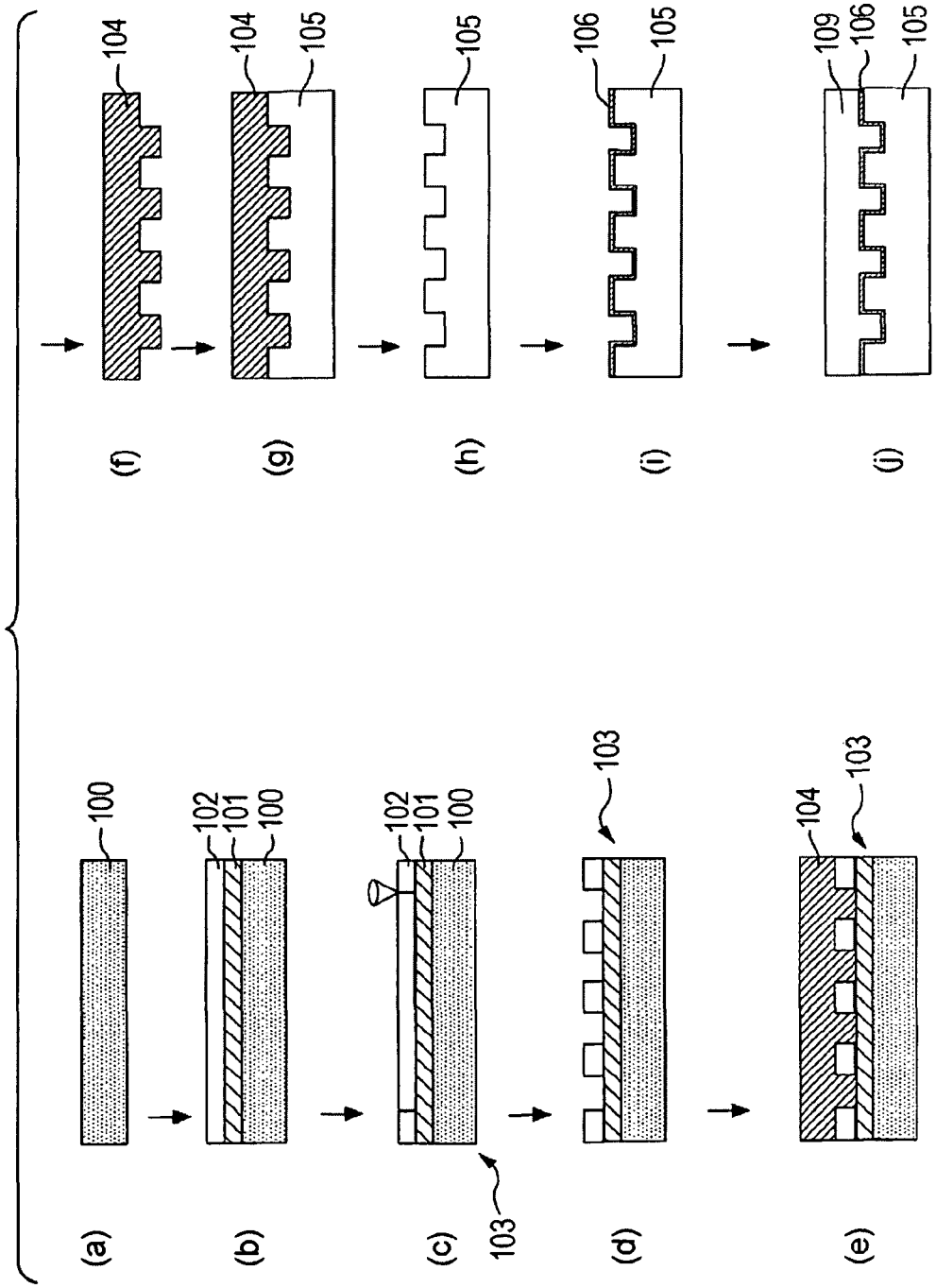
FIG. 11 is an illustration of a process of manufacturing a disc according to the embodiment.

In FIG. 11, (a) illustrates a master disc substrate 100 constituting a master disc. First, a resist layer 102 made of an inorganic resist material is evenly formed on the master disc substrate 100 by a sputtering method (resist layer forming step, see (b) in FIG. 11). In this example, mastering based on a PTM (phase transition mastering) method using an inorganic resist material is performed as a mastering step of manufacturing a master disc. In this case, an incomplete oxide of transition metal is used as a material of the resist layer 102, and specific examples of the transition metal include Ti, V, Cr, Mn, Fe, Nb, Cu, Ni, Co, Mo, Ta, W, Zr, Ru, and Ag.

Additionally, a predetermined intermediate layer 101 mall be formed between the substrate 100 and the resist layer 102 in order to improve the exposure sensitivity of the resist layer 102, and (b) in FIG. 11 illustrates that state. The thickness of the resist layer 102 can be arbitrarily set, but should preferably be in the range of 10 to 80 nm.

Then, selective exposure corresponding to a pit array as a signal pattern is performed on the resist layer 102 by using a master disc manufacturing apparatus described below, so that the resist layer 102 is exposed to light (resist layer exposure step, see (c) in FIG. 11). Then, development (etching) is performed on the resist layer 102 so as to generate a master disc 103 on which a predetermined projection-and-depression pattern (pit array) is formed (resist layer developing step, see (d) in FIG. 11).

Then, a metallic nickel film is precipitated on the projection-and-depression pattern of the master disc 103 generated in the above-described manner (see (e) in FIG. 11), the metallic nickel film is separated from the master disc 103, and a predetermined treatment is performed on the metallic nickel film, so that a molding stamper 104 to which the projection-and-depression pattern of the master disc 103 is transferred can be obtained (see (f) in FIG. 11).

By using the stamper 104, a resin disc substrate 105 made of polycarbonate, which is a thermoplastic resin, is molded by an injection molding method (see (g) in FIG. 11).

Then, the stamper 104 is separated (see (h) in FIG. 11), and a reflective film 106 made of an Ag alloy or the like (see (i) in FIG. 11) and a protective film 107 having a thickness of about 0.1 mm are formed on the projection-and-depression surface of the resin disc substrate 105, so that an optical disc is obtained (see (j) in FIG. 11). That is, a disc for reproducing only on which a pit array is formed is manufactured.

In the above-described manufacturing process, the resist material applied to the resist layer 102 used for manufacturing the master disc 103 is an incomplete oxide of transition metal. Here, the incomplete oxide of transition metal is defined as a compound containing a smaller amount of oxygen than a stoichiometric composition according to the valence that can be held by transition metal. In other words, the amount of oxygen contained in the incomplete oxide of transition metal is smaller than that contained in a stoichiometric composition according to the valence that can be held by the transition metal.

An example is given by using a chemical formula $MoO_3$ as an oxide of transition metal. When an oxidized state of the chemical formula $MoO_3$ is converted to a composition rate $Mo_{1-x}O_x$, $x=0.75$ corresponds to a complete oxide, whereas $0<x<0.75$ corresponds to an incomplete oxide containing a smaller amount of oxygen than the stoichiometric composition.

In some transition metals, a single element can form oxides of different valences. In that case, an actual amount of oxygen contained is smaller than the stoichiometric composition according to the valence that can he held by the transition metal. For example, in Mo, the above-described trivalent oxide ($MoO_3$) is the most stable, but a univalent oxide (MoO) also exists. In this case, when the oxidized state is converted to a composition rate $Mo_{1-x}O_x$, a range of $0<x<0.5$ corresponds to an incomplete oxide containing a smaller amount of oxygen than the stoichiometric composition. The valence of a transition metal oxide can be analyzed by a commercially available analyzer.

Such an incomplete oxide of transition metal absorbs ultraviolet light or visible light, and the chemical property thereof changes when being irradiated with ultraviolet light or visible light. As a result, etching speed differs between an exposed portion and an unexposed portion in development even in an inorganic resist, that is, so-called selectivity can be obtained. Furthermore, in the resist material containing an incomplete oxide of transition metal, the pattern of a border between an unexposed portion and an exposed portion is clear because the particle size of a film material is small, and thus resolution can be increased.

In the incomplete oxide of transition metal, the property as a resist material changes depending on the degree of oxidation, and thus an optimal degree of oxidation is selected according to necessity. For example, an incomplete oxide containing a much smaller amount of oxygen than a stoichiometric composition of a complete oxide of transition metal has disadvantages of requiring a strong irradiation power during exposure and long-time development. For this reason, an incomplete oxide containing a slightly smaller amount of oxygen than a stoichiometric composition of a complete oxide of transition metal is preferably used.

As described above, specific examples of transition metal contained in the resist material include Ti, V, Cr, Mn, Fe, Nb, Cu, Ni, Co, Mo, Ta, W, Zr, Ru, and Ag. Among them, Mo, W, Cr, Fe, or Nb is preferably used. Particularly, Mo or W is preferably used in view of obtaining a significant chemical change by ultraviolet light or visible light.

In the above-described optical disc manufacturing process, the master disc 103 is manufactured in the master disc manufacturing step (mastering step) illustrated in (c) and (d) in FIG. 11. In the mastering step in this example, the PTM method performed by a master disc manufacturing apparatus (described below) is used. Hereinafter; the PTM method is briefly described.

When discs such as CDs (compact discs) or DVDs (digital versatile discs) are manufactured in a method according to a related art, not using the PTM method, a master disc coated with a photoresist (organic resist) is prepared first, and then laser light is applied from a light source, such as a gas laser, onto the master disc by a mastering apparatus (master disc manufacturing apparatus), so as to form an exposure pattern according to pits. In this case, the intensity of the laser light from the laser light source, which is a continuous-wave laser, is modulated by an AOM (acousto-optical modulator) or the like and the laser light of which intensity, has been modulated is led to the master disc by an optical system, so that exposure is performed. That is, a pit modulation signal, e.g., an NRZ (non return to zero) modulation signal, is applied to the AOM, which modulates the intensity of laser light according to a pit pattern, whereby only a pit portion on the master disc is exposed.

Figure 12:
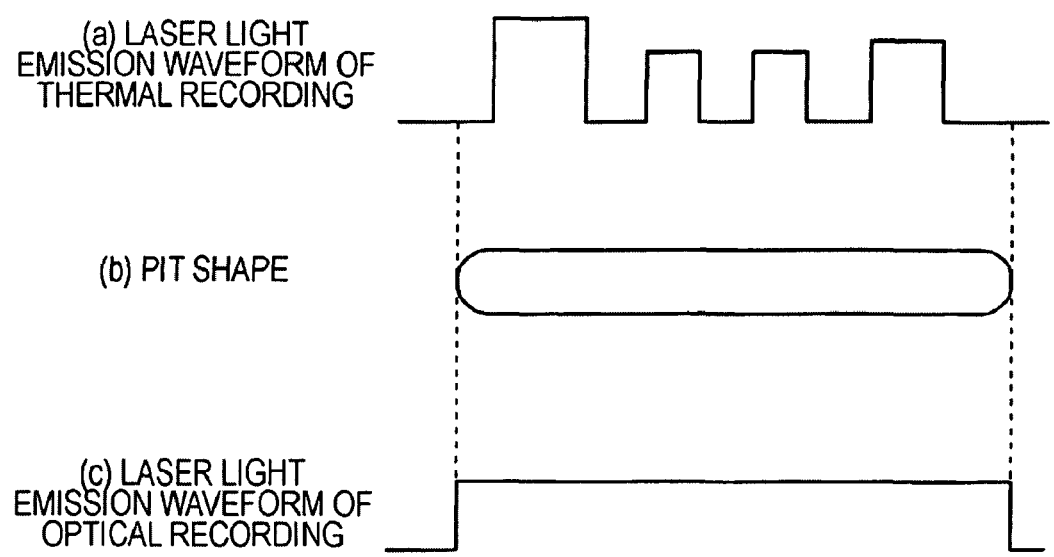
FIG. 12 is an illustration of a PTM method according to the embodiment.

Referring to FIG. 12, (b) illustrates the shape of a pit. The emission intensity of laser light modulated by the AOM is illustrated in (c) in FIG. 12. Exposure of the photoresist on the master disc is so-called optical recording, and thus the portion exposed to the laser light illustrated in (c) in FIG. 12 corresponds to a pit.

On the other hand, in the PTM method, laser light is applied from a semiconductor laser onto a master disc coated with an inorganic resist, so as to perform exposure as thermal recording.

In this case, exposure is normally performed by pulse emission illustrated in (a) in FIG. 12 in order to suppress accumulation of heat generated by laser irradiation and to uniform pit widths. That is, in this case, an NRZ modulation signal synchronous with a clock is converted to a pulse signal having a time width shorter than a clock cycle in accordance with the length of the H level of the NRZ modulation signal, and power is supplied to the semiconductor laser capable of performing direct modulation in synchronization with the pulse modulation signal generated through the conversion. Accordingly, as illustrated in (a) in FIG. 12, laser light is output as pulse emission according to the pit length. Then, by performing development after exposure as thermal recording by pulse emission has been performed, the pit shape as illustrated in (b) in FIG. 12 is formed.

<2. Configuration of Master Disc Manufacturing Apparatus>

Figure 1:
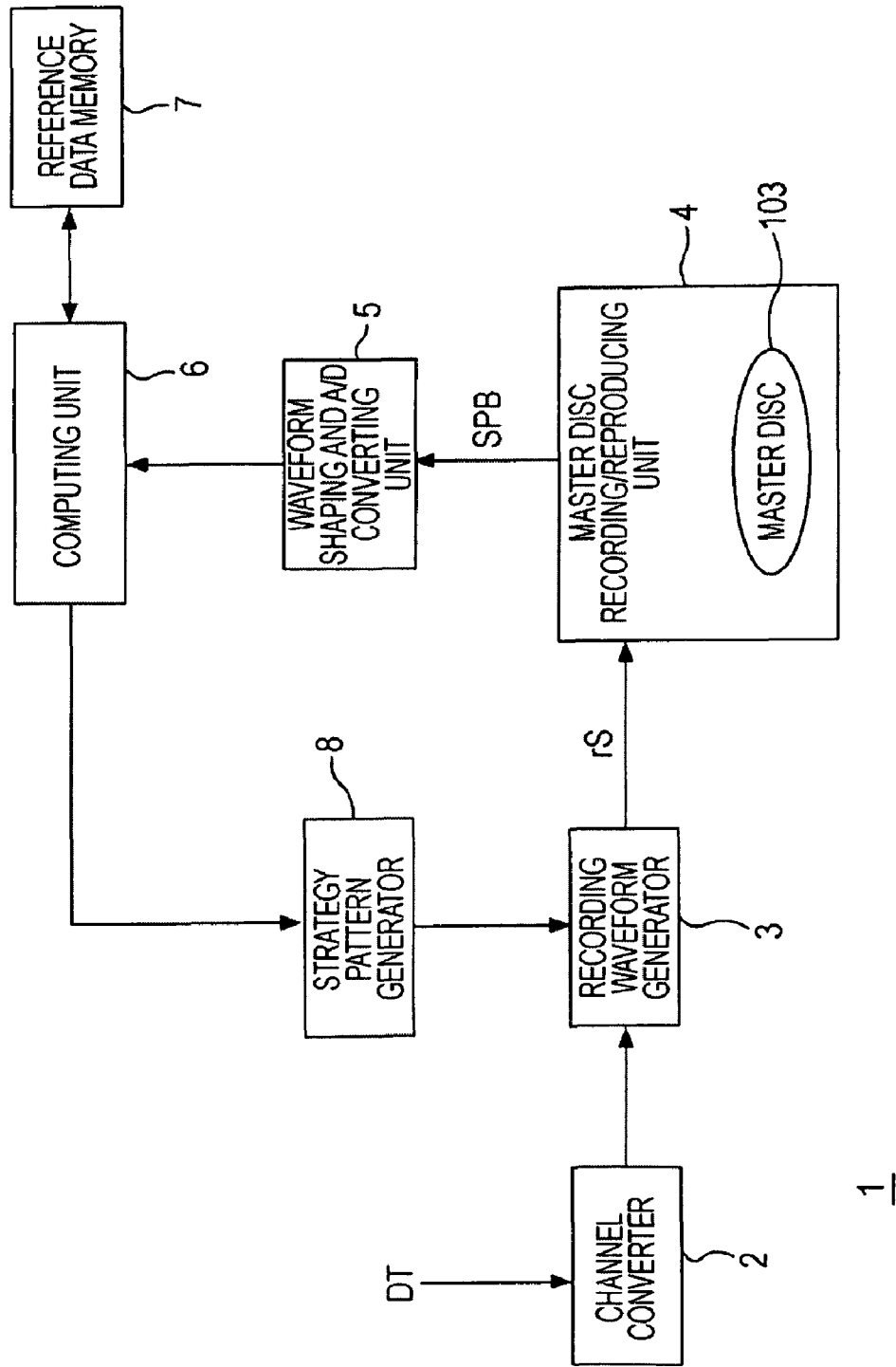
FIG. 1 is a block diagram of a master disc manufacturing apparatus according to an embodiment.

FIG. 1 illustrates an example of a configuration of a master disc manufacturing apparatus 1 that performs mastering in the PTM method. The master disc manufacturing apparatus 1 performs exposure of a pit pattern on the master disc 103 having the inorganic resist layer 102 by a thermal recording operation through laser irradiation in the mastering step illustrated in (c) and (d) in FIG. 11.

The master disc manufacturing apparatus 1 includes a channel converter 2, a recording waveform generator 3, a master disc recording/reproducing unit 4, a waveform shaping and A/D converting unit 5, a computing unit 6, a reference data memory 7, and a strategic pattern generator 8.

The channel converter 2 generates a modulation signal to be recorded (exposed) on the master disc based on recording data DT input thereto. The recording data is to be expressed by a pit pattern in an optical disc that is eventually manufactured. The channel converter 2 modulates the recording data by using a modulation method of RLL(1-7)pp or the like and outputs data patterns having a limited run-length, such as 2T to 9T, as a modulation signal.

The modulation signal is input to the recording waveform generator 3 and is converted to a recording drive waveform (strategy pattern) rS in the form of a pulse train for thermal recording in the recording waveform generator 3.

Figure 3:
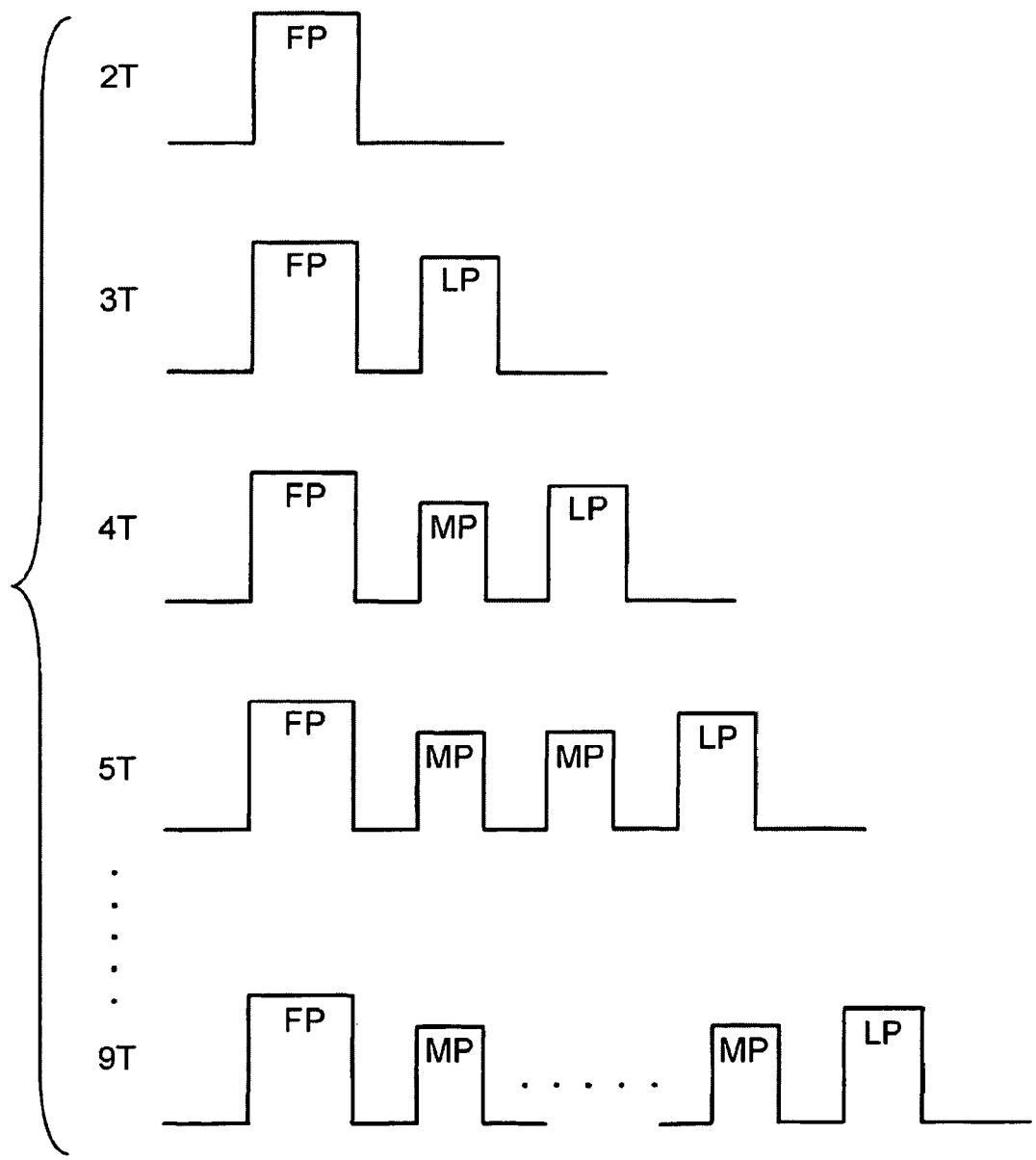
FIG. 3 is an illustration of strategy patterns according to the embodiment.

The strategy pattern generator 8 generates strategy patterns corresponding to pit lengths of 2T to 9T, as illustrated in FIG. 3.

The strategy pattern corresponding to 2T includes a first pulse FP having a certain level and a certain pulse width that are set.

The strategy pattern corresponding to 3T includes a first pulse FP and a last pulse LP, each having a certain level and a certain pulse width that are set.

The strategy patterns corresponding to 4T to 9T include a first pulse FP, a multi pulse MP, and a last pulse LP, each having a certain level and a certain pulse width that are set. The number of multi pulses MP between the first pulse FP and the last pulse LP is different in the respective 4T to 9T.

The strategic pattern generator 8 is capable of generating strategy patterns of 2T to 9T, for example. The recording waveform generator 3 selects a strategy pattern in accordance with the run length of the modulation signal supplied from the channel converter 2 and outputs the selected strategy pattern as a recording drive waveform rS.

The pulse train of the strategy pattern output as the recording drive waveform rS is supplied to the master disc recording/reproducing unit 4.

The master disc recording/reproducing unit 4 performs pulse modulation on a laser beam based on the recording drive waveform rS and applies the laser beam onto the master disc, so as to perform recording (exposure of the inorganic resist layer 102). Then, heat generated by the irradiation of the master disc with the pulse-modulated laser beam causes a change in characteristic of the inorganic resist layer 102 coating the surface of the master disc, whereby a recording mark is formed.

Figure 4:
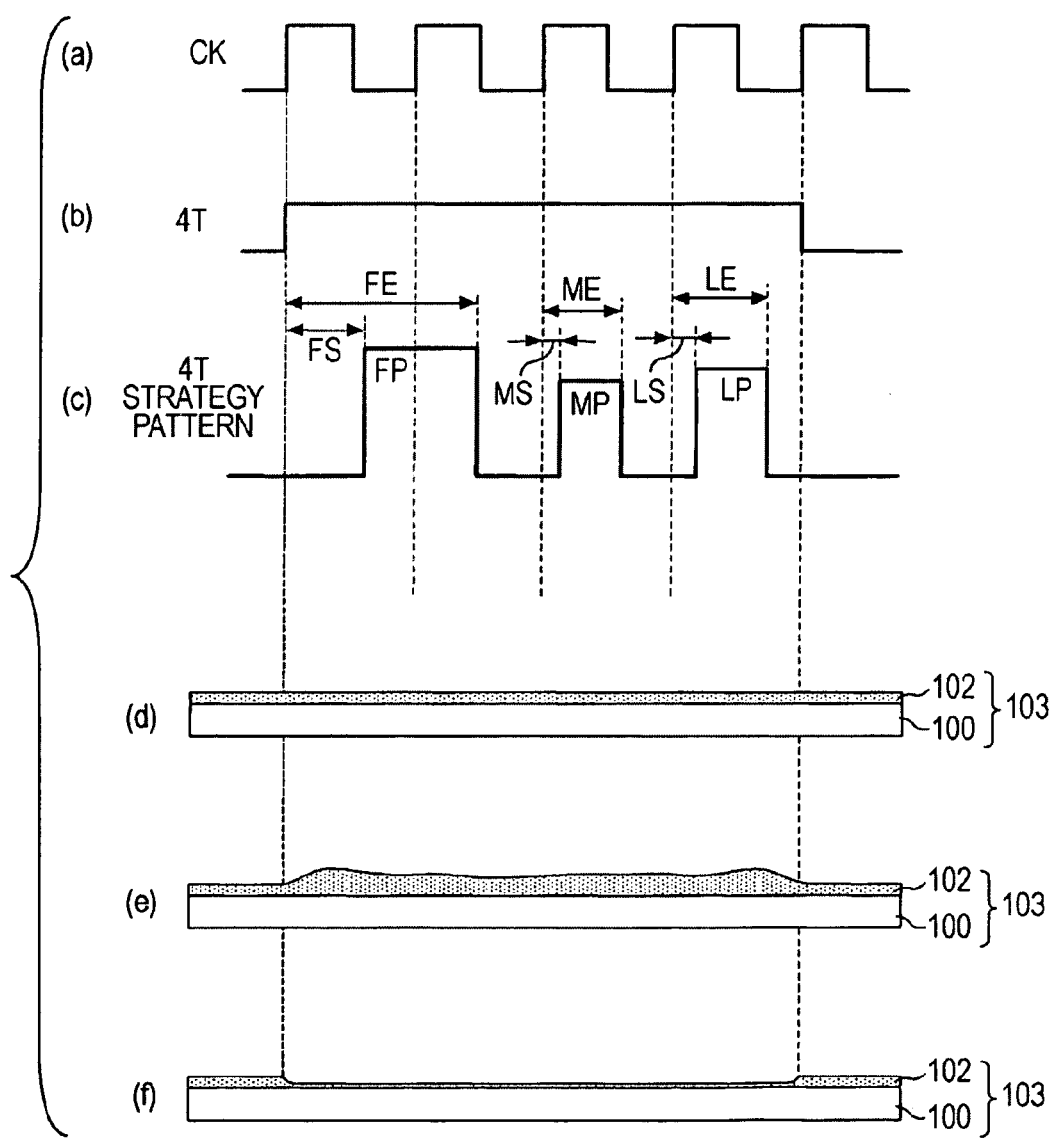
FIG. 4 is an illustration of a state during exposure on a master disc according to the embodiment.

FIG. 4 illustrates an exposure state of the inorganic resist layer 102.

In FIG. 4, (a) illustrates a channel clock CK and (b) illustrates a 4T portion as a modulation signal output from the channel converter 2. Corresponding to the 4T portion of the modulation signal, a strategy pattern including the first pulse FP, the multi pulse MP, and the last pulse LP (see (c) in FIG. 4) is output as the recording drive waveform rS from the recording waveform generator 3 to the master disc recording/reproducing unit 4.

The master disc recording/reproducing unit 4 performs laser irradiation based on the recording drive waveform rS on the master disc 103 having the inorganic resist layer 102, as illustrated in (d) in FIG. 4.

In this case, the nature a portion exposed in thermal recording by laser irradiation is changed as illustrated in (e) in FIG. 4 and becomes a recording mark.

After such exposure has been performed in the master disc recording/reproducing unit 4, development is performed as illustrated in (d) in FIG. 11. Due to the development, the recording mark formed by exposure becomes a pit of a depressed shape, as illustrated in (f) in FIG. 4.

Also, the master disc recording/reproducing unit 4 is capable of performing a reproducing operation on the master disc 103 that has been exposed and that has not been developed (in the state illustrated in (e) in FIG. 4).

That is, by performing laser light irradiation on an area including an exposed portion to become a pit and an unexposed portion to become a land while setting the power of the laser light to low (reproducing power, which is power not causing change of nature of the inorganic resist layer 102 due to heat), different amounts of reflected light can be detected in the exposed portion and the unexposed portion. This is a reproduced signal of information of a pit array as pit/land formed on the master disc 103.

Figure 2:
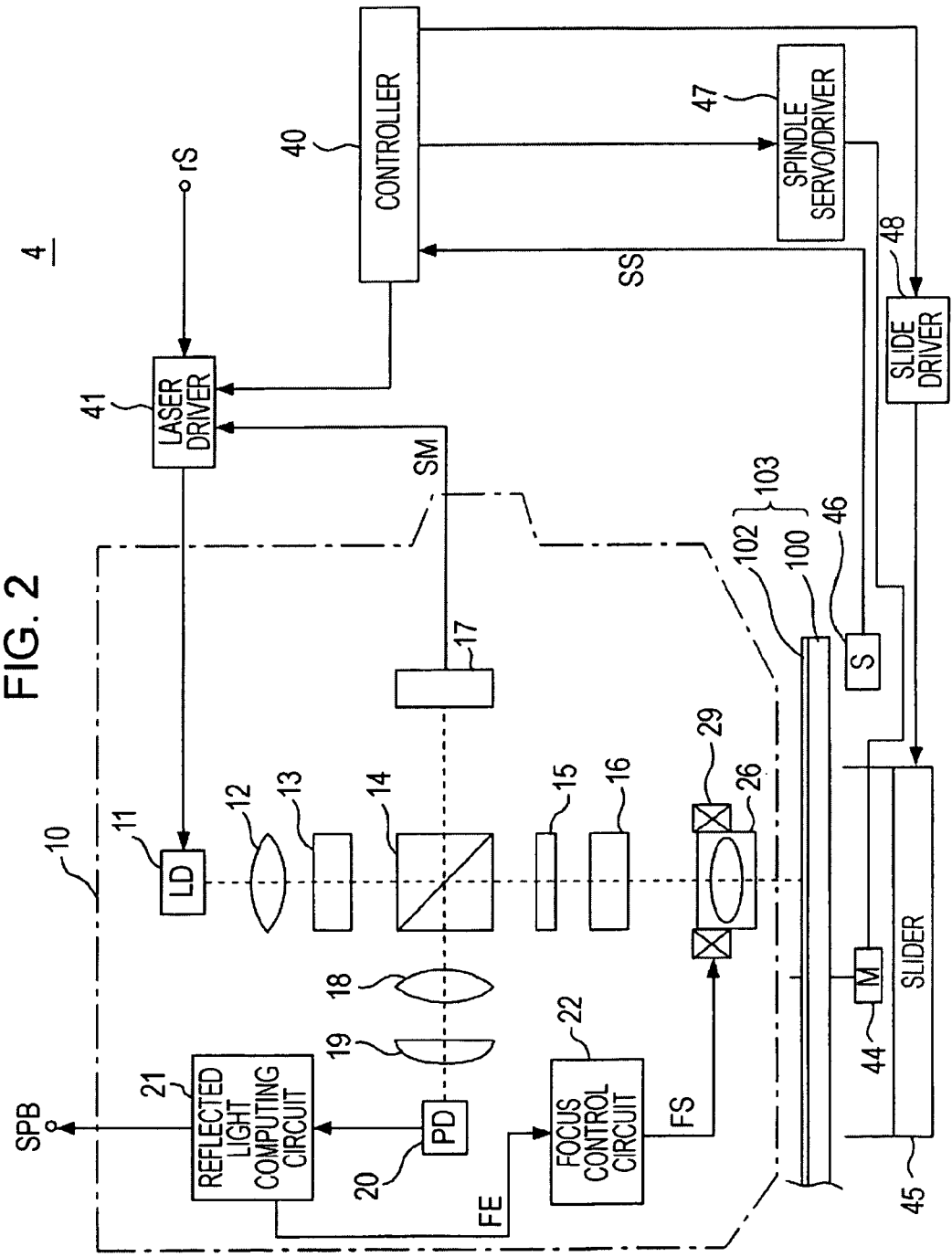
FIG. 2 is an illustration of a configuration of a master disc recording/reproducing unit according to the embodiment.

FIG. 2 illustrates an example of an internal configuration of the master disc recording/reproducing unit 4.

The master disc recording/reproducing unit 4 includes elements surrounded by a chain line as a pickup head 10. In the pickup head 10, a laser light source 11 serving as a semiconductor laser outputs laser light having a wavelength of 405 nm, for example.

The laser light output from the laser light source 11 becomes parallel light in a collimator lens 12, the spot shape thereof is changed to circular by an anamorphic prism 13, and then the laser light is led to a polarization beam splitter 14.

A polarization component passed through the polarization beam splitter 14 is led to an objective lens 26 via a λ/4 wavelength plate 15 and a beam expander 169 and is focused through the objective lens 26 onto the master disc 103 (the master disc substrate 100 on which the inorganic resist layer 102 is formed).

The laser light having a wavelength of 405 nm from the laser light source 11 applied onto the master disc 103 via the objective lens 26 in the above-described manner is focused on the master disc 103. The master disc 103 is manufactured by forming an inorganic resist containing a metal oxide on a silicon wafer. By absorbing a laser beam of 405 nm, a portion near the center of an irradiated portion heated to a high temperature is polycrystallized.

With this action, the change in nature described above with reference to (e) in FIG. 4 occurs, and an exposure pattern as a pit array is formed on the master disc 103.

A polarization component reflected in the polarization beam splitter 14 is applied to a monitor detector 17 (photodetector for monitoring a laser power). The monitor detector 17 outputs a light intensity monitor signal SM according to the level (intensity) of received light.

On the other hand, returned light of the laser light applied onto the master disc 103 passes through the objective lens 26, the beam expander 16, and the λ/4 wavelength plate 15 and reaches the polarization beam splitter 14. In this case, the light passes through the λ/4 wavelength plate 15 twice (outward and homeward) and thus the polarization plane thereof is rotated by 90 degrees, so that the light is reflected by the polarization beam splitter 14. The returned light reflected by the polarization beam splitter 14 passes through a collective lens 18 and a cylindrical lens 19 and is applied onto a light receiving surface of a photodetector 20.

The light receiving surface of the photodetector 20 has four parts, for example, and can obtain a focus error signal caused by astigmatism.

Each part of the right receiving surface of the photodetector 20 outputs a current signal according to the amount of received light and supplies the current signal to a reflected light computing circuit 21.

The reflected light computing circuit 21 converts the current signals from the respective four parts of the light receiving surface to voltage signals, performs computation in an astigmatism method to generate a focus error signal FE, and supplies the focus error signal FE to a focus control circuit 22.

The focus control circuit 22 generates a servo drive signal FS for an actuator 29 that holds the objective lens 26 such that the objective lens 26 can move in a focus direction, based on the focus error signal FE. When the actuator 29 drives the objective lens 26 in a direction of contacting the master disc 103 or separating from the master disc 103 based on the servo drive signal FS focus servo is performed.

Also, the reflected light computing circuit 21 can generate a reflected light amount detection signal indicating the level of reflected light by adding voltage signals of the amounts of received light in the four parts of the light receiving surface.

For example, when exposure is performed in the above-described manner, laser light is output at a high-level recording power to cause change in nature of the inorganic resist layer 102 due to heat. As described above, after the exposed portion as illustrated in (e) in FIG. 4 has been formed, by irradiating the exposed portion with laser light of a reproducing power (low power), information of the exposed potion/unexposed portion can be obtained as reflected-light information (reproducing information).

In a case of performing reproducing after exposure, the reflected light computing circuit 21 can generate a detection signal of the amount of reflected light and output the generated signal as a reproduced signal SPB.

Light emission drive of the laser light source 11 is performed by a laser drive 41. As described above With reference to FIG. 1, the recording drive waveform rS that is supplied from the recording waveform generator 3 to the master disc recording/reproducing unit 4 is input to the laser driver 41. The laser driver 41 applies a light emission drive current to the laser light source 11 in accordance with input pulses forming the recording drive waveform rS (strategy pattern). Accordingly, pulse emission of laser light is performed at emission intensity according to the pulse pattern as the recording drive waveform rS.

Also, the light intensity monitor signal SM obtained from the monitor detector 17 is supplied to the laser driver 41. The laser driver 41 compares the light intensity monitor signal SM with a reference value in order to perform control to maintain the emission intensity of laser light at a predetermined level.

The laser driver 41 can change the laser power in units of 0.01 mW.

In order to perform exposure on the master disc 103, a controller 40 allows the laser driver 41 to perform laser output of a recording power (e.g., about 9 to 10 mW). On the other hand, in order to perform reproducing after exposure as described above, the controller 40 allows the laser driver 41 to perform laser output of a reproducing power (e.g., about 0.5 mW).

The master disc 103 is driven to rotate by a spindle motor 44. The spindle motor 44 is driven to rotate while the rotation speed thereof is controlled by a spindle servo/driver 47. Accordingly, the master disc 103 is rotated at a certain linear speed.

A slider 45 is driven by a slide driver 48 and moves an entire base including a spindle mechanism on which the master disc 103 is mounted. That is, the master disc 103 that is being rotated by the spindle motor 44 is exposed to light by the above-described optical system while being moved in a radius direction by the slider 45, so that tracks constituted by an exposed pit array are formed in a spiral pattern.

A movement position by the slider 45, that is, an exposure position of the master disc 103 (disc radius position: slider radius position), is detected by a sensor 46. The detected-position information SS generated by the sensor 46 is supplied to the controller 40.

The controller 40 controls the entire master disc recording/reproducing unit 4. That is, the controller 40 performs setting of a laser power of the laser driver 41, control of a spindle rotation operation by the spindle servo/driver 47, and control of a movement operation of the slider 45 by the slide driver 48.

With the configuration illustrated in FIG. 2, the master disc recording/reproducing unit 4 illustrated in FIG. 1 can perform exposure (mastering recording) and reproducing on the master disc 103.

A reproduced signal (reflected-light information) SPB output by a reproducing operation after exposure is supplied to the waveform shaping and A/D converting unit 5 illustrated in FIG. 1.

The reproduced signal SPB is waveform-shaped by equalizing and is A/D converted in the waveform shaping and A/D converting unit 5, and is then supplied as digital data to the computing unit 6.

The computing unit 6 performs zero-cross detection and a digital PLL process on the input reproduced signal SPB as digital data and calculates deviation from a reference clock of an edge of an exposure pattern as pit/land to be formed. Then, a length and a positional deviation of each pit of 2T to 9T are calculated by a statistical process.

After calculating pit lengths and positional deviations, the computing unit 6 compares them with reference data stored in the reference data memory 7 and determines whether an appropriate write strategy state has been obtained.

If an appropriate write strategy state has not been obtained, a correction value is calculated and the strategy pattern generated by the strategy pattern generator 8 is corrected based on the correction value.

As correction of a strategy pattern, a pulse edge timing or a pulse level is corrected, for example.

In FIG. 4, (c) illustrates the strategy pattern corresponding to 4T. As a pulse edge timing to be corrected, the following timings based on the channel clock CK are assumed: a rising timing FS and a falling timing FE of the first pulse FP; a rising timing MS and a falling timing ME of the multi pulse MP; and a rising timing LS and a falling timing LE of the last pulse LP.

Also, the levels of the first pulse FP, the multi pulse MP, and the last pulse LP may be corrected.

<3. Strategy Correcting Operation>

Now, a strategy correcting operation in the master disc manufacturing apparatus 1 having the above-described configuration is described. Strategy correction is performed in the procedure illustrated in FIG. 5.

First, in step F101, test recording (test exposure) is performed at a predetermined position of the master disc 103.

In this case, test recording data is given to the channel converter 2. As the test recording data, real recording data that is actually used or random data may be used.

The channel converter 2 modulates the test recording data and supplies it to the recording waveform generator 3. The recording waveform generator 3 sequentially selects strategy patterns in accordance with signals of 2T to 9T in a modulation signal and supplies each strategy pattern as the recording drive waveform rS to the laser driver 41 of the master disc recording/reproducing unit 4.

In the master disc recording/reproducing unit 4, test exposure is performed at a predetermined position of the master disc 103 that is loaded.

Figure 6:
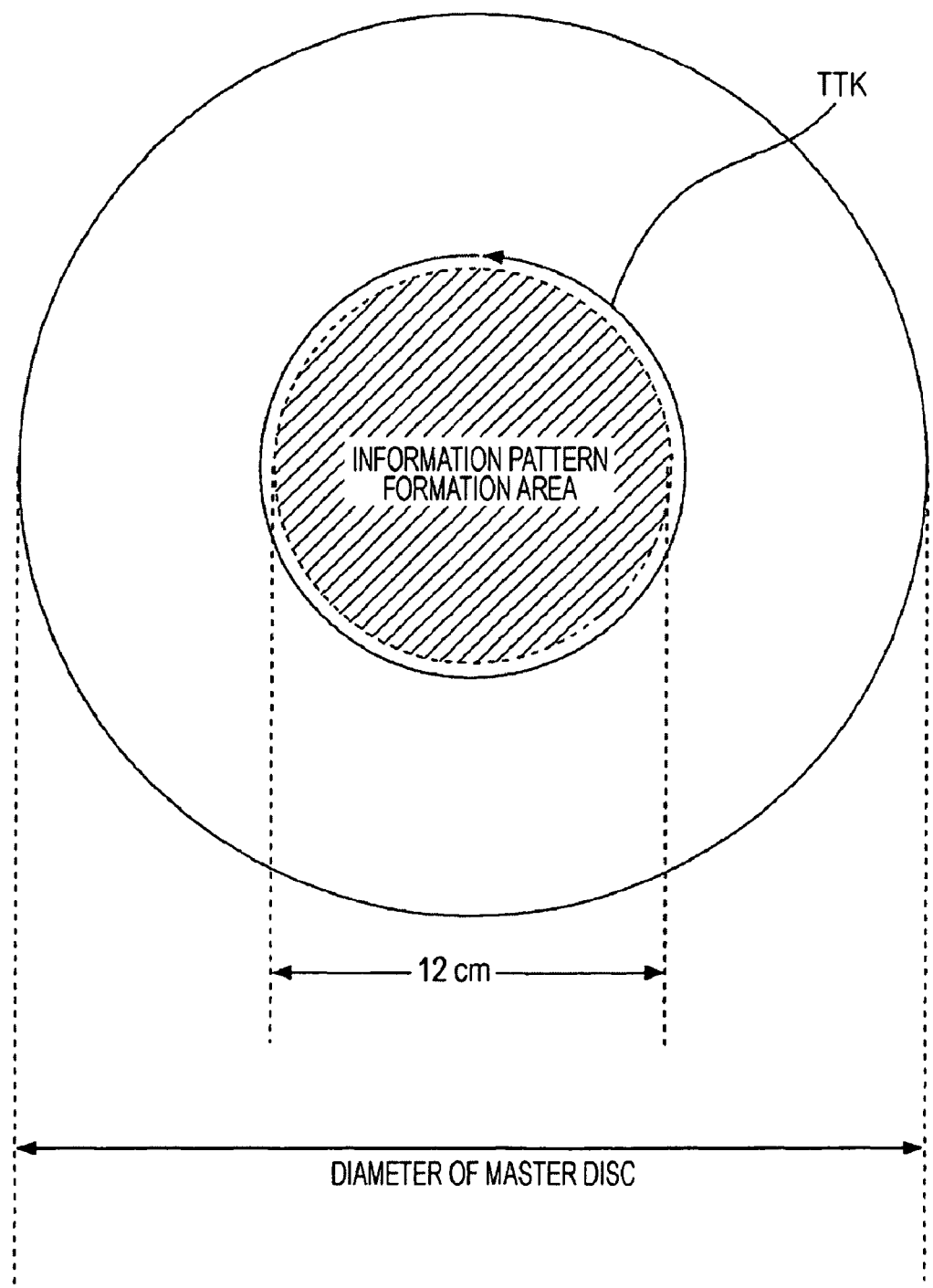
FIG. 6 is an illustration of an area where test recording is performed according to the embodiment.

FIG. 6 schematically illustrates the master disc 103. The diameter of the master disc 103 is about 8 inches, for example. On the other hand, the diameter of an optical disc as an end product manufactured by using a stamper that is made b using the master disc 103 is 12 cm. Therefore, the area of a diameter of 12 cm (shaded area) in the master disc 103 serves as an information pattern formation area where pits are actually formed according to real data.

At the test recording, an area other than the information pattern formation area, that is, a peripheral area of the information pattern formation area is used.

In this example, test recording is performed as a concentric one-turn track TTK in the peripheral area near the information pattern formation area The test recording may be performed in the area other then the information pattern formation area, not always be near the information pattern formation area, as illustrated in FIG. 6. However, it is preferred for the purpose of strategy adjustment that the test recording is performed in an area as near as possible to the information pattern formation area because a characteristic difference of the inorganic resist layer 102 (characteristic difference between inner and outer circumferences on the master disc 103) is small there.

The information pattern formation area illustrated in FIG. 6 is the entire area of a diameter of 12 cm. The inner-most circumference thereof, that is, the area corresponding to a center hole of the stamper or the optical disc, may be used as an area for the test recording.

For example, when test recording of one track as a concentric one-turn track TTK illustrated in FIG. 6 is performed, the controller 40 of the master disc recording/reproducing unit 4 controls the slider 45 so that laser irradiation is performed at a position on a slightly outer side of the diameter of 12 cm. That is, the controller 40 controls the slider 45 to a slide position: a radius position of 6 cm+α, with reference to the detected-position information SS from the sensor 46.

Then, the controller 40 instructs the laser driver 41 to output laser light of a recording power and allows the laser driver 41 to perform pulse light emission according to the recoding drive waveform rS. Also, the controller 40 allows the spindle servo/driver 47 to rotate the spindle motor 44.

At this time, the controller 40 allows the slider 45 to be fixed at the slide position: a radius position of 6 cm+α, whereby test exposure is performed as a concentric one-turn track TTK.

Then, referring back to FIG. 5, the test recording portion is reproduced in step F102.

The controller 40 of the master disc recording/reproducing unit 4 instructs the laser driver 41 to output laser light at a reproducing power while keeping the slider 45 fixed at the position of the time of recording. In this case, laser light is continuously emitted from the laser light source 11 at a reducing power. Also, the spindle servo/driver 47 is allowed to rotate the spindle motor 44 continuously from the time of recording.

Actually, rotation of the spindle motor 44 in a state of recording (exposure) of one track in step F101 is continued and the position of the slider 45 is kept fixed. Thus, by switching the laser power to a reproducing power just after recording of one track in step F101, scan for reproducing of the recorded track TTK can be performed. Particularly, tracking control enabling scan of the exposed portion at reproducing is unnecessary.

The reproduced signal SPB obtained by reproducing the test recording portion is input as digital data to the computing unit 6.

Then, the reproduced data is examined by the computing unit 6 in step F103.

The computing unit 6 performs zero-cross detection and a digital PLL process on the digital data of the input reproduced signal SPB and calculates deviation from a reference clock of an edge of each recording mark and space generated by exposure. Then, the computing unit 6 calculates the length and position of each recording mark by a statistical process. More specifically, the computing unit 6 obtains information of lengths of pits of 2T to 9T to be formed and positional deviations based on the clock timing, and regards the information as a characteristic detected in the test recording.

Then, the computing unit 6 compares the detected characteristic with the reference characteristic stored in the reference data memory 7.

Figure 7A:
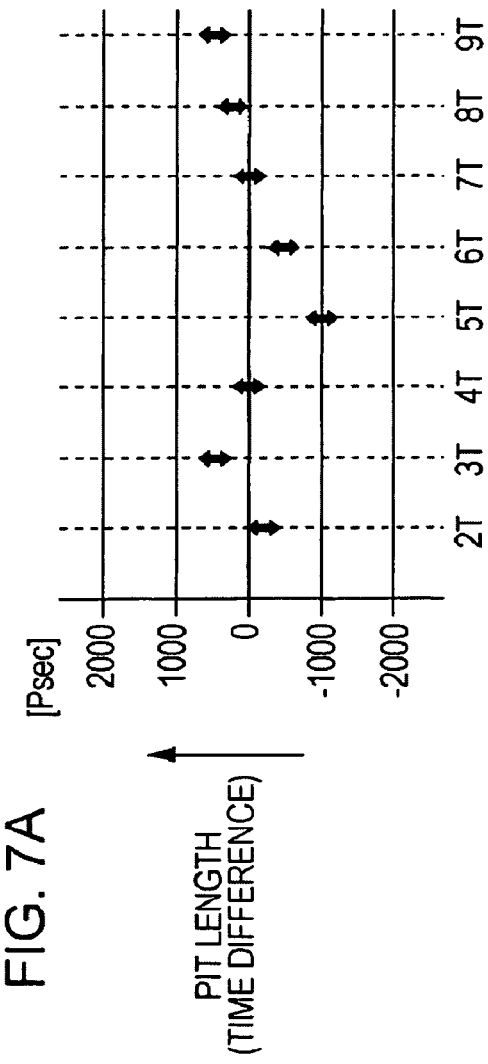
FIGS. 7A and 7B are illustrations of reference ranges according to the embodiment.
Figure 7B:
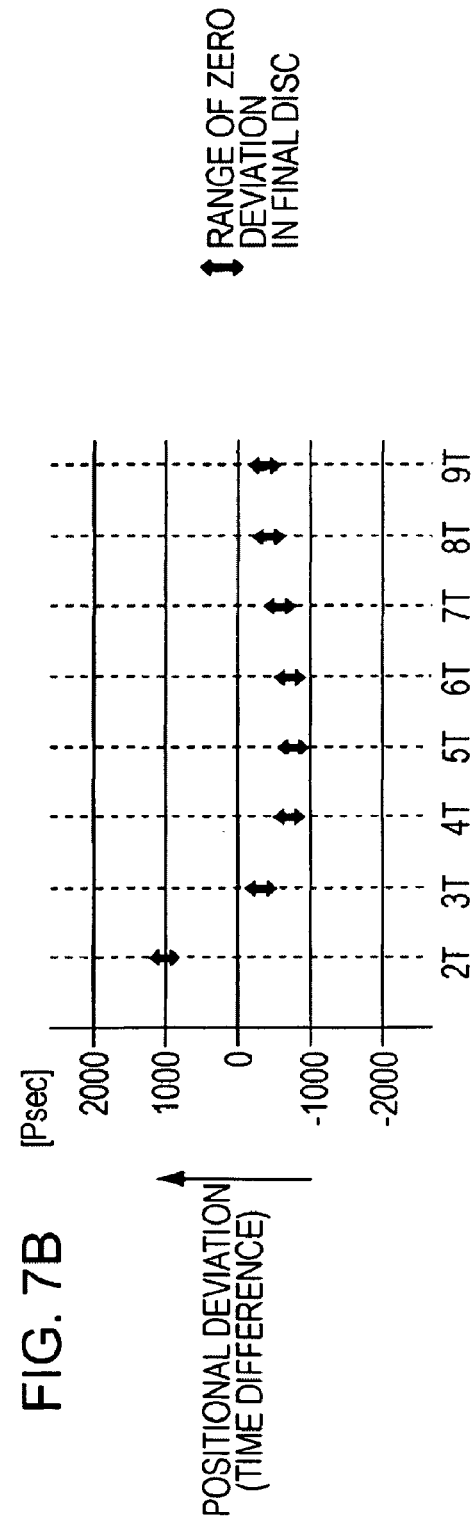

FIGS. 7A and 7B illustrate reference ranges held as the reference data.

In FIG. 7A, the vertical axis indicates a pit length, and respective cases of 2T to 9T are shown along the horizontal axis. The pit length in the vertical axis is indicated as a time difference in the unit of [Psec]. That is, scanning time of each pit of 2T to 9T when the recording track is scanned with laser light at certain linear speed is relatively shown with an original pit length being a reference. In other words, a reference pit length that is originally desired is "0", a length longer than the reference pit length is indicated by a time difference value in the positive direction, and a length shorter than the reference pit length is indicated by a time difference value in the negative direction. In 2T, for example, a 2T pit is an accurate pit length if the time difference as a pit length is "0". A time difference of "1000" indicates that the 2T pit is longer by 1000 psec than the pit length that is originally desired. On the other hand, a time difference of "−1000" indicates that the 2T pit is shorter by 1000 psec than the pit length that is originally desired. This is the same in 3T to 9T.

In FIG. 7A, reference ranges as respective recording marks of 2T to 9T generated by exposure on the master disc 103 are indicated with arrows. The reference ranges are ranges of appropriate pit lengths.

In an optical disc that is eventually manufactured, all time differences indicated as appropriate pit lengths should be "0". However, the ranges of pit lengths indicated with arrows in FIG. 7A are deviated from "0". This is because FIG. 7A illustrates the recording marks of portions to be pits on the master disc 103. The pits formed on the master disc 103 are reflected on pits of an optical disc as an end product through the manufacturing process illustrated in FIG. 11. However, due to various factors in the manufacturing process, the pits on the master disc 103 and the pits on the optical disc have different pit lengths.

The reference ranges of pit lengths illustrated in FIG. 7A are set so that the pit lengths in those ranges on the master disc 103 correspond to substantially appropriate pit lengths (pit lengths of time difference value of almost "0") on an optical disc as an end product.

FIG. 7B illustrates positional deviations of respective pits of 2T to 9T on the master disc 103, in the same manner as that in FIG. 7A. The positional deviation is a deviation in a lead/delay direction, indicated as a value of time difference in the positive/negative direction, with a case where a pit starts at an appropriate timing based on a channel clock timing corresponding to a time difference of "0".

In FIG. 7B, too, appropriate ranges of positional deviations on the master disc 103, which are ranges enabling a time difference of almost "0" in an optical disc as an end product, are indicated with arrows.

The computing unit 6 compares the data of those reference ranges with a detected characteristic of pit lengths and positional deviations of 2T to 9T that are actually calculated based on the digital data of the reproduced signal SPB.

Figure 8A:
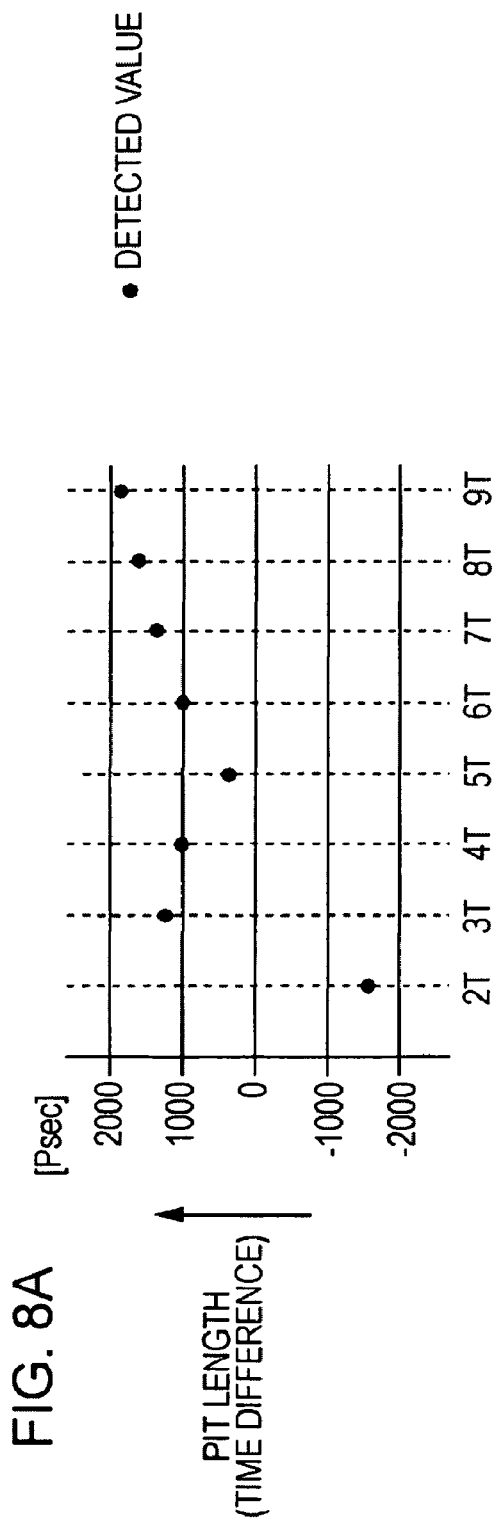
FIGS. 8A and 8B are illustrations of detected values of a characteristic in test recording according to the embodiment.
Figure 8B:
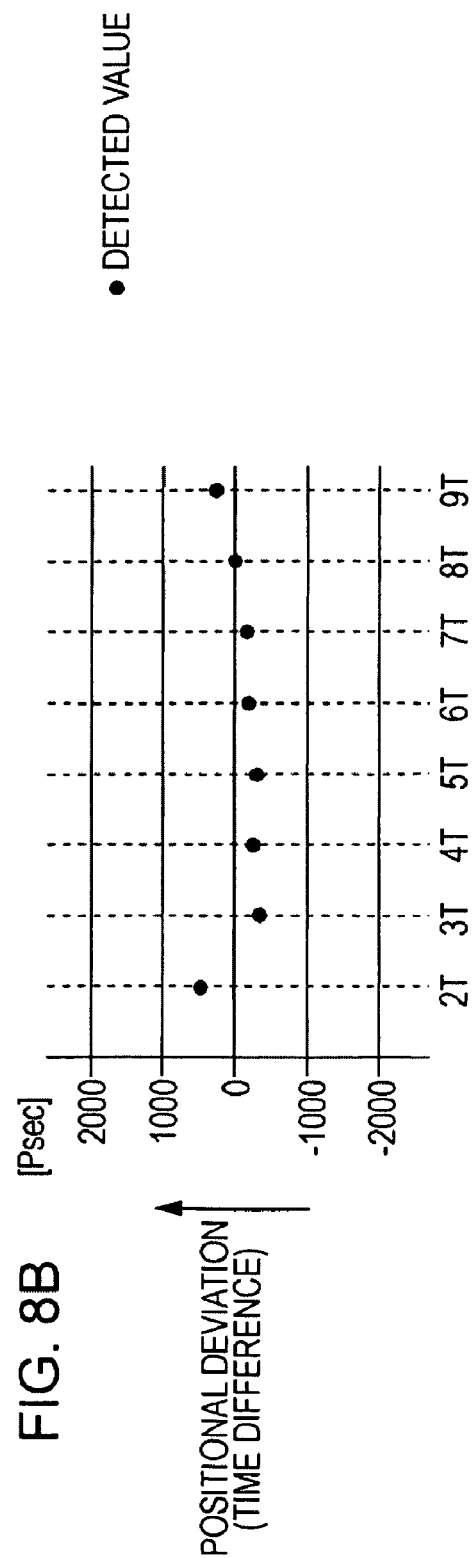

An example of a characteristic of pit lengths and positional deviations of 2T to 9T detected through test recording/reproducing is illustrated in FIGS. 8A and 8B. FIGS. 8A and 8B illustrate detected values of pit lengths and positional deviations of 2T to 9T in the same manner as that in FIGS. 7A and 7B.

The computing unit 6 compares detected values indicating the pit lengths and positional deviations of 2T to 9T with the reference ranges illustrated in FIGS. 7A and 7B. The computing unit 6 determines OK if the detected values are in the reference ranges, and determines that strategy correction should be performed if any of the detected values is outside the reference range.

Figure 5:
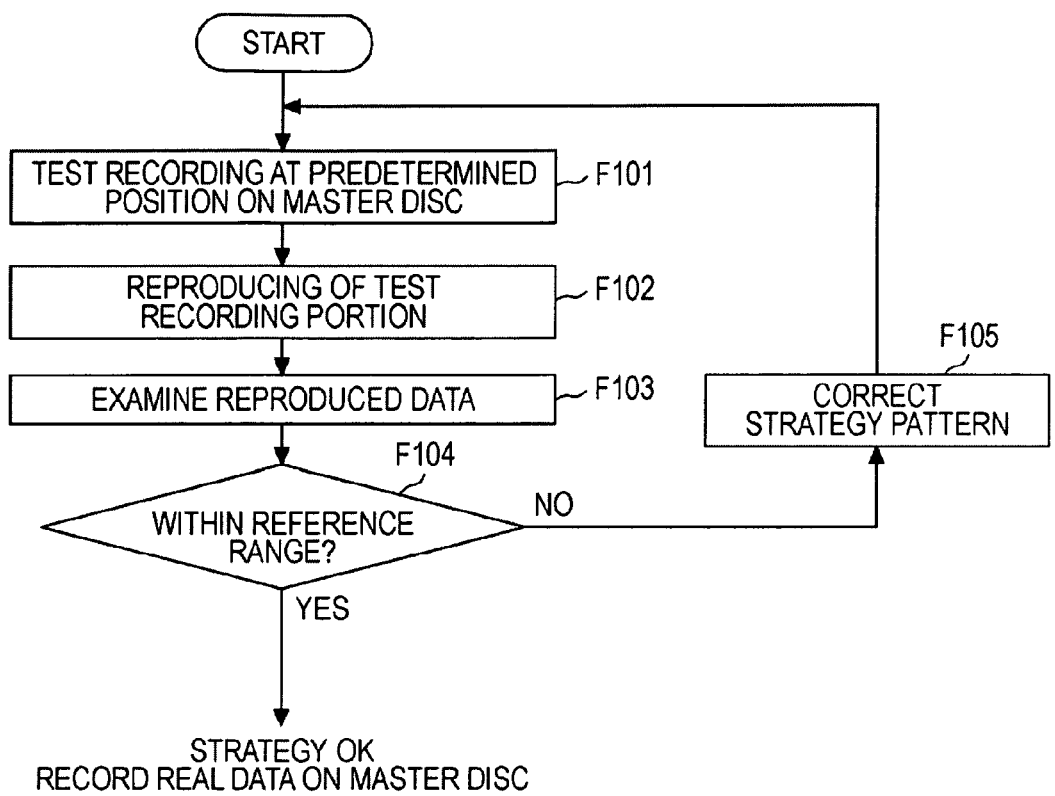
FIG. 5 is a flowchart of a strategy pattern correcting operation according to the embodiment.

In step F103 in FIG. 5, the pit lengths and positional deviations of 2T to 9T are detected from the digital data of the reproduced signal SPB and are compared with the reference ranges.

If all the detected values are in the reference ranges, a determination of strategy OK is made in step F104.

On the other hand, if any of the detected values is outside the reference range, the process proceeds from step F104 to F105, where the strategy pattern is corrected.

FIGS. 9A and 9B collectively illustrate the reference ranges in FIGS. 7A and 7B and the detected values in FIGS. 8A and 8B.

As illustrated in FIGS. 9A and 9B, if the respective detected values are outside the reference ranges, the computing unit 6 performs strategy correction in step F105. That is, as indicated with broken arrows in the figures, the computing unit 6 calculates correction values of the strategy patterns so that the respective detected values of pit lengths and positional deviations of 2T to 9T are in the reference ranges, so as to correct the strategy patterns generated in the strategy pattern generator 8. For example, edge timings are corrected.

Figure 10:
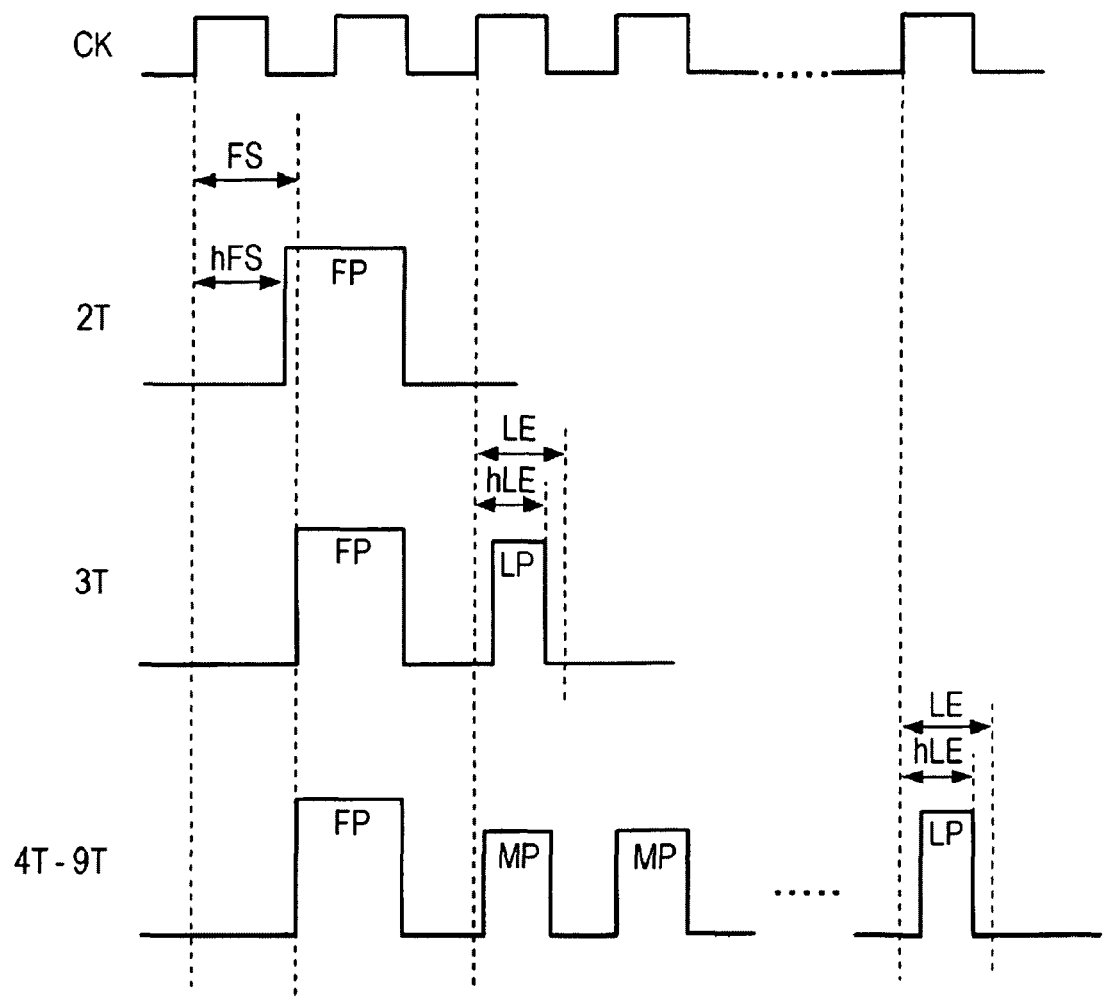
FIG. 10 is an illustration of an example of strategy pattern correction according to the embodiment.

An example of correction in this case is illustrated in FIG. 10.

FIG. 10 illustrates a strategy pattern of 2T, a strategy pattern of 3T, and a strategy pattern of 4T to 9T, with a channel clock CK being a reference.

For example, in the strategy pattern of 2T, the rising timing FS of the first pulse FP is corrected to a timing hFS.

On the other hand, in 3T and 4T to 9T, the falling timing LE of the last pulse LP is corrected to a timing hLE.

When attention is focused on the recording mark of 2T, the pit length is under the reference range, and the positional deviation is outside the reference range. Thus, the rising timing of the first pulse FP is changed to an earlier timing. On the other hand, in the recording marks of 3T to 9T, the pit length is over the reference range, and thus the falling timing of the last pulse LP is changed to an earlier timing.

In this example, two parts: the rising timing of the first pulse FP and the falling timing of the last pulse LP, are corrected. In other cases, another pulse edge timing or a pulse level may be corrected.

How the correction is to be performed or the amount of timing correction and level correction is calculated through predetermined computation using the detected characteristic and the reference ranges.

By measuring an effect obtained by changing a pulse edge timing or an effect obtained by changing a pulse level in advance, more efficient correction can be performed.

The strategy correction is performed in the above-described manner as the procedure illustrated in FIG. 5.

After the strategy patterns are corrected in step F105, test recording is performed again in step F101. In this case, for example, the position of the slider 45 is moved by about one track and is fixed there, and then second test recording can be performed in the master disc recording/reproducing unit 4.

Then, the test recording portion is reproduced in step F102 and the computing unit 6 examines the reproduced data in step F103. If the detected values are in the reference ranges, it is determined that the strategy patterns have been optimized. If the detected values are outside the reference ranges, the strategy patterns are corrected again in step F105, and the process is performed again from step F101.

In the process illustrated in FIG. 5, if it is determined that the detected values are in the reference ranges in step F104 and that the strategy patterns are optimized, then exposure based on actual recording data is performed in the information pattern formation area of the master disc 103.

After the exposure in the information pattern formation area has been completed, development is performed, whereby the master disc 103 is completed. This master disc 103 has pits generated by exposure using the optimized strategy patterns.

As can be understood from the description made above, according to the embodiment, strategy patterns for laser light irradiation in the stage of manufacturing a master disc can be adjusted by test exposure, reproducing of the exposed area, and determination of pit lengths and pit positions obtained from reflected-light information obtained through the reproducing during manufacturing of the master disc 103.

That is, strategy adjustment can be performed before manufacturing optical discs as end products, and the efficiency of the process can be significantly increased. Of course, a master disc, a stamper, and an optical disc that are wasted later are not manufactured for strategy adjustment, and thus the waste can be eliminated.

Furthermore, all the corrections for strategy adjustment described above as the procedure illustrated in FIG. 5 can take a numerical form, and thus automation can be easily realized and the process from test exposure to strategy correction does not require so much time. Therefore, the efficiency of the process does not decrease even if the strategy correction in step F105 is repeated several times. Accordingly, the strategy patterns can be easily optimized more accurately, and more accurate strategy adjustment can be performed.

Also, for the above-described reason, a special signal is unnecessary as a test recording signal. An ordinary recording signal can be used as the test recording signal, and thus the labor of an operator is reduced accordingly.

Furthermore, the master disc 103 on which test exposure has been performed is used as is for actual manufacturing. That is, strategy adjustment is performed based on test exposure on the master disc 103 that is actually used, and the strategy adjustment is performed in a state without change in condition of the master disc, and thus high accuracy can be obtained in adjustment.

By using such master disc 103, high-quality optical discs can be manufactured as end products, and also the efficiency of the entire manufacturing process can be significantly increased.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording drive waveform adjusting method for manufacturing a master disc, the method comprising:
    forming an exposed area in an inorganic resist layer for test exposure by irradiating a master disc having the inorganic resist layer with laser light of a recording power based on a recording drive waveform according to a test recording signal, wherein the inorganic resist layer is an incomplete oxide of a transition metal;
    obtaining reflected-light information by irradiating the exposed area with laser light of a reproducing power;
    determining whether the recording drive waveform is optimized by using pit-length information and pit-position information obtained from the reflected-light information; and
    correcting the recording drive waveform if the recording drive waveform is not determined to be optimized in the determination.

2. A master disc manufacturing method comprising:
    forming a first exposed area in an inorganic resist layer for test exposure by irradiating a master disc having the inorganic resist layer with laser light of a recording power based on a recording drive waveform according to a test recording signal, wherein the inorganic resist layer is an incomplete oxide of a transition metal;
    obtaining reflected-light information by irradiating the first exposed area with laser light of a reproducing power;
    determining whether the recording drive waveform is optimized by using pit-length information and pit-position information obtained from the reflected-light information;
    correcting the recording drive waveform if the recording drive waveform is not determined to be optimized;
    forming a second exposed area for forming a pit pattern on the inorganic resist layer for real exposure by performing laser irradiation of a recording power according to a real recording signal by using an optimized recording drive waveform after the recording drive waveform has been determined to be optimized; and
    developing the master disc having the second exposed area so as to form a master disc on which a pit pattern of projections and depressions is formed.

3. The master disc manufacturing method according to claim 2,
    wherein, in the test exposure, a test area is selected on the master disc as an area other than an information pattern formation area where the second exposed area is formed, and the second exposed area is formed in the test area.

4. The master disc manufacturing method according to claim 2,
    wherein, in the test exposure, the second exposed area is formed as a concentric track.

5. The master disc manufacturing method according to claim 2,
    wherein the recording drive waveform is a waveform pattern to perform laser irradiation in a PTM method.

6. The master disc manufacturing method according to claim 2, wherein, in the determination, it is determined whether the recording drive waveform is optimized by comparing the pit-length information and the pit-position information obtained from the reflected-light information with reference pit-length information and reference pit-position information set as a reference for comparison.

7. The master disc manufacturing method according to claim 2,
wherein, in the correction, an edge timing or a level of a pulse in a pulse pattern set as a recording drive waveform is corrected.

8. The master disc manufacturing method according to claim 2,
wherein the pit-length information and the pit-position information are obtained by performing a zero-cross detection process and a digital PLL process on the reflected-light information.

9. The master disc manufacturing method according to claim 2, wherein the transition metal is selected from the group consisting of Mo, W, Cr, Fe, and Nb.

10. The master disc manufacturing method according to claim 2, further comprising:
switching the laser light from the recording power to the reproducing power after recording at least one track in the first exposed area,
wherein the reflected-light information is obtained by irradiating the track in the first exposed area with laser light of the reproducing power after the entire at least one track is recorded.

11. A master disc manufacturing apparatus comprising:
a recording drive waveform outputting unit configured to output a recording drive waveform according to an input recording signal;
a master disc recording/reproducing unit capable of forming an exposed area by irradiating a master disc having an inorganic resist layer with laser light of a recording power based on the recording drive waveform output from the recording drive waveform outputting unit and outputting reflected-light information by irradiating the exposed area with laser light of a reproducing power, wherein the inorganic resist layer is an incomplete oxide of a transition metal; and
a determining/correcting unit configured to perform a computing process of determining whether the recording drive waveform is optimized by using pit-length information and pit-position information obtained from the reflected-light information and a correcting process of correcting the recording drive waveform in accordance with a determination result.

12. A master disc that is manufactured by the steps of:
forming an exposed area in an inorganic resist layer by irradiating a master disc having the inorganic resist layer with laser light of a recording power based on a recording drive waveform according to a test recording signal, wherein the inorganic resist layer is an incomplete oxide of a transition metal;
obtaining reflected-light information by irradiating the exposed area with laser light of a reproducing power;
determining whether the recording drive waveform is appropriate by using pit-length information and pit-position information obtained from the reflected-light information;
correcting the recording drive waveform if the recording drive waveform is determined not to be optimized;
forming an exposed area for forming a pit pattern on the inorganic resist layer by performing laser irradiation of a recording power according to a real recording signal by using an optimized recording drive waveform after the recording drive waveform has been determined to be optimized in the determination; and
developing the master disc having the exposed area that is formed based on the real recording signal, so as to form a pit pattern of projections and depressions.

* * * * *